Patented Dec. 2, 1941

2,265,121

UNITED STATES PATENT OFFICE 2,265,121

PROCESS FOR THE MANUFACTURE OF LEVOASCORBIC ACID (VITAMIN C)

Tadeus Reichstein, Zurich, Switzerland, assignor to Hoffmann-La Roche Inc., Nutley, N. J., a corporation of New Jersey No Drawing. Application January 8, 1936, Serial No. 58,222. In Switzerland October 25, 1933

31 Claims. (Cl. 260—344)

This invention relates to the production of levo-ascorbic acid from 2-keto-levo-gulonic acid or its derivatives, and is in part, a continuation of my earlier application Serial Number 748,924 filed October 18, 1934.

The physiologically important levo-ascorbic acid has recently been prepared synthetically from levo-xylosone (=levo-lyxosone) by reaction with prussic acid followed by acid saponification. It was identical with the natural body and proved to be biologically active vitamin-C (Helvetica Chimica Acta, 16, 1933, p. 1019).

This first process has the advantage of being generally applicable; it has so far in all investigated cases yielded the corresponding 3-keto-acids or their anhydrides. For the preparation of levo-ascorbic acid in particular, however, there is the disadvantage that the starting material, levo-xylosone, is obtainable only with difficulty and by expensive means.

It has now been found that a second process for the manufacture of levo-ascorbic acid consists in treating 2-keto-levo-gulonic acid, in given cases after previous esterification, with inorganic or organic bases and then with acids in order to liberate the levo-ascorbic acid. When using the esterified keto-acid, it is advantageous to use as exactly as possible one mol of alkali preferably in anhydrous solvents.

The same transformation of the 2-keto-levo-gulonic acid occurs also in acid reaction at temperatures from about 60° C. upwards with rapidly increasing velocity. The heating of the 2-keto-levo-gulonic acid may be carried out without further addition or after previous dilution with solid or liquid diluents. Catalytically active substances, for instance organic or inorganic acids, salts and the like, may also be added.

As the levo-ascorbic acid does not stand long heating, it is to be recommended, when performing a technical transformation in acid solution, to interrupt the treatment after transformation of part of the 2-keto-levo-gulonic acid, to separate the ascorbic acid in a suitable manner in order to prevent its decomposition and with the remaining 2-keto-levo-gulonic acid to repeat the same process.

Instead of 2-keto-levo-gulonic acid all compounds, which by reaction with acids yield 2-keto-levo-gulonic acid, may be used, for instance salts, esters and methylene-ether-derivatives of 2-keto-levo-gulonic acid.

A similar process, representing a special case, has already been described in the literature. It consists in the transformation of 2-keto-d-glu-conic-acid-methyl-ester with alkaline agents into the 3-keto-d-gluconic-acid-lactone (Zeitschrift für angewandte Chemie, vol. 46, 1933, p. 399; Berichte der Deutschen Chemischen Gesellschaft, vol. 66, 1933, p. 1054). It was however not to be expected, that a similar reaction would be obtainable from 2-keto-levo-gulonic acid and its derivatives, as so far only the special case mentioned above has become known, from which no conclusions could be drawn with regard to the behaviour of other unknown representatives of the 2-keto-hexonic acids. In particular no representatives of this class of bodies were yet known possessing a structure which would have rendered the transformation into levo-ascorbic acid possible. It was only with the discovery of a process for preparing 2-keto-levo-gulonic acid that a suitable starting material became available; moreover the possibility of a transformation was not even then certain, because it could not be foretold, how the new acid would react to alkaline and acid agents, in particular whether it would be stable as free acid or as lactone and whether at all it would form stable esters.

In the following formula R represents cation (including hydrogen), an aliphatic group, an alicyclic group or an aliphatic aromatic (or aralkyl) group:

2-keto-levo-gulonic-acid    levo-ascorbic acid
  or derivatives

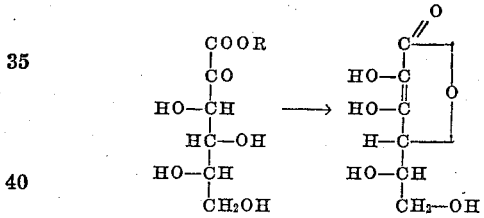

Apparently the conversion of the 2-keto-levo-gulonic-acid or its derivatives to levo-ascorbic-acid involves both enolization and lactonization, irrespective of what the particular order of these changes may be.

The levo-ascorbic acid forms colorless crystals melting at about 190° C. with decomposition. The melting point varies according to the manner of heating; it is a few degrees higher in the evacuated tube. Its specific rotation is $$[\alpha]_D = +49°$$

in methanol (c=1). As is the case with natural ascorbic acids, slightly vacillating values are obtained in water; this may be prevented by the addition of a trace of hydrochloric acid. The specific rotation then is $+24°$ ($c=1$). The synthetic compound corresponds in every respect with the natural ascorbic acid; it has in particular a curative effect on scurvy.

Example 1

50 parts by weight of 2-keto-levo-gulonic-acid-methyl-ester are dissolved in 2000 parts by weight of anhydrous methanol and after replacement of the air by nitrogen or other indifferent gas a hot solution of 5.7 parts by weight of sodium in about 200 parts by weight of methanol are added while shaking or stirring thoroughly. A white or at most slightly yellow precipitate is obtained. The transformation is terminated in a few minutes. The product is then acidified with pure iron-free hydrochloric acid. The solution should now be acid to Congo-paper and a sample, diluted with water and a little starch-solution, should by titration with iodine solution give a value which, calculated for the whole quantity, corresponds to about 40 parts by weight of ascorbic acid (1 ccm. $n/10$ iodine solution=8.8 mgms. of ascorbic acid).

The methanol is distilled off under slight vacuum and the remaining solution evaporated in vacuo to dryness. In order to separate the common salt the residue is extracted with absolute alcohol, the solution filtered from the sodium chloride and evaporated in vacuo to a syrup, which very soon crystallises either spontaneously or on being scratched. After having been left to stand for some time it is ground with acetone, sucked off and washed with acetone. From the mother liquors considerable quantities may be obtained by evaporating to a syrup and further treatment as described above. The total yield is about 35 parts by weight of the crude product of a pure white color. It usually contains a little common salt and has a somewhat too low melting point. For purification it is recrystallised from a little water, alcohol or methanol by evaporating the solutions; the crystals, which are slowly formed, are finally washed with acetone.

Example 2

30 parts by weight of diacetone-2-keto-levo-gulonic-acid-hydrate are heated with 150 parts by weight of aqueous 0.2 normal hydrochloric acid to 100° C. for 3 hours, whereby in the first half hour acetone evaporates. The slightly yellow solution is evaporated in vacuo to a syrup and, if there is no crystallisation, seeded with a trace of pure 2-keto-levo-gulonic acid. After being left to stand for a short time the product is moistened with acetone, the liquid removed by suction, the residue washed with a little alcohol and afterwards with acetone. 14 parts by weight of 2-keto-levo-gulonic acid are obtained, which should be inactive to acid iodine solution, otherwise it must be recrystallised.

The mother liquors are evaporated in vacuo to a syrup, seeded with a little ascorbic acid, the paste of crystals moistened with acetone and the liquid removed by suction. The yield is 3 parts by weight of ascorbic acid.

The remaining mother liquors yield further small quantities of levo-ascorbic acid and 2-keto-levo-gulonic acid.

The 14 parts by weight of 2-keto-levo-gulonic acid thus obtained are again heated with five times the quantity of 0.2 normal hydrochloric acid to 100° C. for 3 hours. If the product is worked up as described above, 2.1 parts by weight of levo-ascorbic acid and 9.2 parts by weight of 2-keto-levo-gulonic acid are obtained.

Taking into consideration the recovered quantities of 2-keto-levo-gulonic acid, the total yield of levo-ascorbic acid by this process of transformation is about 60% of the theoretical quantity.

Example 3

200 parts by weight of 2-keto-levo-gulonic-acid-methyl-ester are dissolved in 2000 parts by weight of water, about 200 parts by weight of pure calcium carbonate are added and the product heated in a weak current of carbon dioxide for 2 hours to 80° C. The undissolved calcium carbonate is removed by filtration in an atmosphere of carbon dioxide and the calcium exactly precipitated from the solution with aqueous oxalic acid, about 100 parts by weight of crystalline oxalic acid dissolved in about 100 parts by weight of water being required. The solution is liberated from calcium oxalate by filtration and evaporated in vacuo to dryness, the crude levo-ascorbic acid remaining in crystalline form. It is taken up in boiling anhydrous alcohol, separated from impurities by filtration and separated in pure form on cooling from the clear solution after evaporating. The mother liquor from the first crystallisation will yield a small second and possibly also a third portion. The total yield is 125–135 parts by weight representing about 75–80% of the theoretical quantity.

Example 4

100 parts by weight of 2-keto-levo-gulonic-acid-methyl-ester are dissolved in 1000 parts by weight of anhydrous alcohol, 50 parts by weight of dry tri-ethylamine are added and the product heated for 30 minutes to 80° C. with exclusion of air and carbon-dioxide. After cooling 30 parts by weight of glacial acetic acid are added followed by lukewarm saturated alcoholic lead acetate solution until no more precipitate is formed. The yellow-white precipitate is centrifuged, washed with alcohol, dispersed in water, which has previously been saturated with carbon-dioxide, and hydrogen sulphide passed in, until all light-colored particles have disappeared. After removing the lead sulphide by filtration, the colorless solution thus obtained is evaporated in vacuo to dryness, whereby very pure ascorbic acid is left behind. This acid is once more recrystallised from alcohol. After working up the alcoholic mother liquors a total yield of 65 parts by weight of pure levo-ascorbic acid, representing 77% of the theoretical quantity, is obtained.

Example 5

100 parts by weight of 2-keto-levo-gulonic acid are dissolved in 500 parts by weight of anhydrous alcohol, 75 parts by weight of ethyl-ortho-formate are added and one part by weight of dry hydrochloric acid gas is passed in. The mixture is left to stand for some hours at room temperature, then heated for 3 hours to 60° C. and evaporated in vacuo to a syrup, which is liberated from the hydrochloric acid by prolonged drying in vacuo. The syrup is then dissolved in 1000 parts by weight of water, which has been boiled in a stream of nitrogen, and after addition of 150 parts by weight of pyridine heated in a nitrogen atmosphere for 2 hours to 80° C. The product is then evaporated to dryness in vacuo. If the remaining syrup, owing to its too large content of pyridine, does not crystallise, more water is added, distilled off in vacuo and this treatment repeated. Crystallisation will then soon set in, especially after seeding with ascorbic acid. The acid is filtered off after diluting with a little anhydrous alcohol and the mother liquor again treated in a similar manner. As a rule about 20 parts by weight of pure levo-ascorbic acid are obtained. The purification through the lead salt, as described in Example 4, may also be carried out, whereby yields of about 50% by weight are directly obtained. The mother liquors left over from the direct crystallisation may be worked up with the aid of the lead salt.

*Example 6*

100 parts by weight of 2-keto-levo-gulonic acid are heated in 500 parts by weight of water in an atmosphere of carbon dioxide for 2 hours to 100° C. The solution is evaporated in vacuo to a syrup and this syrup seeded with a little 2-keto-levo-gulonic acid, after which the unchanged acid quickly crystallises. The crystals are removed by suction and washed with acetone. The mother liquor is evaporated in vacuo to a syrup, the syrup seeded with ascorbic acid, left to crystallise, the crystals removed by suction and washed with acetone. This procedure is repeated with the remaining mother liquor. From the last mother liquors a small quantity of ascorbic acid may be obtained through the lead salt, as described in Example 4. Altogether an average of 82.5 parts by weight of pure 2-keto-levo-gulonic acid is recovered and about 8 parts by weight of pure ascorbic acid are obtained. The first mentioned may serve for a new operation. Taking into consideration the amounts recovered, the yield of pure ascorbic acid is about 50% of the theoretical quantity.

*Example 7*

22 parts by weight of 2-keto-levo-gulonic-acid-allyl-ester (a yellow syrup-like liquid) are dissolved in 200 parts by weight of alcohol and boiled with 10 parts by weight of sodium bicarbonate and 20 parts by weight of water for 3 hours at the reflux condenser while stirring. After cooling the precipitate is removed by suction and washed with absolute alcohol. It is dissolved in water, rendered just acid to Congo paper with dilute hydrochloric acid and evaporated to dryness. The residue is extracted with methyl alcohol. From the methyl-alcoholic solution the crude levo-ascorbic acid is obtained by evaporation. It may be recrystallised from absolute alcohol.

*Example 8*

5 parts by weight of 2-keto-levo-gulonic-acid-cyclopentyl-ester (colorless crystals melting at 115° C.) are dissolved in 50 parts by weight of methyl alcohol, 0.5 part by weight of sodium in 5 parts by weight of methanol are added and the mixture stirred for an hour. The reaction product is then worked as described in Example 7.

*Example 9*

28 parts by weight of 2-keto-levo-gulonic-acid-benzyl-ester (indistinct crystals melting at about 100° C.) are dissolved in 300 parts by weight of water, 30 parts by weight of calcium carbonate are added and the product heated in a weak current of carbon dioxide for 2 hours to 80° C. The undissolved calcium carbonate is removed by filtration in an atmosphere of carbon dioxide and the calcium precipitated from the solution with aqueous oxalic acid. The solution is liberated from calcium oxalate by filtration and evaporated in vacuo to dryness, the crude levo-ascorbic acid remaining in crystalline form. The crude levo-ascorbic acid is recrystallised from absolute alcohol.

*Example 10*

14.9 parts by weight of 2-keto-levo-gulonic acid-phenyl-ethyl-ester (white crystals melting at 115° C.) are dissolved in 100 parts by weight of 90% alcohol, 7 parts by weight of sodium bicarbonate are added and the product boiled for 3 hours under a reflux condenser while stirring. After cooling the solid residue is removed by suction from the sodium ascorbate and an excess of sodium bicarbonate. The further working is the same as described in Example 7.

The 2-keto-levo-gulonic acid used as a starting material may be produced according to the process described in my application, Serial Number 748,925, filed October 18, 1934. In such process levo-sorbose is transformed into the corresponding bis-methylene-ether derivatives by reaction with carbonyl compounds, such as formaldehyde, acetone, methyl-ethyl-ketone and the like. These compounds protect all the reactive hydroxyl groups other than that of the terminal primary alcohol group contiguous to the keto group. The bis-methylene-ether derivatives are then treated in alkaline solution with oxidizing agents which oxidize the unprotected $CH_2OH$ group to the carboxyl group. These oxidizing agents include, for example, permanganate, ferricyanide and the like. The bis-methylene-ether-2-keto-levo-gulonic acid obtained by the addition of strong acid is then heated with water or dilute acid in order to split off the protecting carbonyl compound, yielding 2-keto-levo-gulonic acid.

As will be evident from the above description, the process should be so conducted that the intermediate 2-keto-levo-gulonic acid is protected against undesired oxidation. Since the ascorbic acid is a strong reducing agent, it is obvious that enolization and lactonization must be carried out under such conditions that no oxidizing action on the levoascorbic acid occurs. Hydrochloric acid has proven to be a most desirable conversion agent because it is non-oxidizing, is inexpensive, can easily be eliminated, and has the requisite strength to produce good yields. The term "hydrochloric acid," as is clear from Examples 2 and 5, is intended to cover this compound in either gaseous or aqueous form.

I claim:

1. The process for the manufacture of levo-ascorbic acid, which consists in heating diacetone-2-keto-levo-gulonic acid with an acid which is non-oxidizing under the conditions of the reaction.

2. The process for the manufacture of levo-ascorbic acid, which consists in heating diacetone-2-keto-levo-gulonic acid with hydrochloric acid.

3. The process for the manufacture of levo-ascorbic acid, which consists in allowing 2-keto-levo-gulonic-acid-methyl-ester after treatment with sodium-methylate to react with hydrochloric acid.

4. The process for the manufacture of levo-ascorbic acid, which consists in allowing 2-keto-levo-gulonic-acid-methyl-ester in methanol solution after treatment with sodium methylate to react with hydrochloric acid.

5. In a process for the manufacture of levo-ascorbic acid, the steps which comprise reacting levo-sorbose with a compound which is capable of protecting all the reactive hydroxyl groups other than that of the terminal primary alcohol group contiguous to the keto group, oxidizing such terminal alcohol group, splitting off the protecting compound, and heating the product with an acid which is non-oxidizing under the conditions of the reaction to form levoascorbic acid.

6. In a process for the manufacture of levo-ascorbic acid, the step which comprises enolizing and lactonizing a compound of the group consisting of 2-keto-levo-gulonic acid and derivatives which yield such acid in the presence of acids, by treating such compound with an acid which is non-oxidizing under the conditions of the reaction.

7. In a process for the manufacture of levo-ascorbic acid, the step which comprises heating a methylene-ether derivative of 2-keto-levo-gulonic acid with an acid which is non-oxidizing under the conditions of the reaction.

8. In a process for the manufacture of levo-ascorbic acid, the step which comprises enolizing and lactonizing a compound of the group consisting of 2-keto-levo-gulonic acid and derivatives which yield such acid in the presence of acids, by treating such compound with a non-oxidizing mineral acid in a diluent.

9. A process for the manufacture of levo-ascorbic acid which comprises treating diacetone-2-keto-levo-gulonic acid with a non-oxidizing mineral acid in a diluent.

10. In a process for the manufacture of levo-ascorbic acid, the step which comprises enolizing and lactonizing 2-keto-levo-gulonic acid by treating it with an acid which is non-oxidizing under the conditions of the reaction.

11. In a process for the manufacture of levo-ascorbic acid, the step which comprises enolizing and lactonizing 2-keto-levo-gulonic acid by treating it with a non-oxidizing mineral acid.

12. A process for the manufacture of levo-ascorbic acid, the step which comprises enolizing and lactonizing 2-keto-levo-gulonic acid by treating it with a non-oxidizing mineral acid in a diluent.

13. In a process for the manufacture of a compound containing the levo-ascorbic acid radical, the step which comprises effecting enolization and $\tau$-lactonization of a compound selected from the group consisting of 2-keto-levo-gulonic acid, its salts obtainable by neutralization or double decomposition of the carboxyl group, its carboxylic esters and its methylene ether derivatives by treatment with an agent which effects enolization and $\tau$-lactonization thereof to a compound containing the levo-ascorbic acid radical, which modifies the existing pH and which is non-oxidizing under the conditions of the reaction in the presence of an organic solvent.

14. In a process for the manufacture of a compound containing the levoascorbic acid radical from levo-sorbose, the steps which comprise oxidizing only the terminal primary alcohol group contiguous to the keto group of levo-sorbose to produce a 2-keto-levo-gulonic acid compound, and treating the oxidation product with an agent which effects enolization and $\tau$-lactonization of the oxidation product to a compound containing the l-ascorbate radical, which modifies the existing pH and which is non-oxidizing under the conditions of the reaction.

15. In a process for the manufacture of a compound containing the levoascorbic acid radical, the steps which comprise reacting levo-sorbose with a compound which is capable of protecting all the reactive hydroxyl groups other than that of the terminal primary alcohol group contiguous to the keto group, oxidizing such terminal alcohol group, splitting off the protecting compound, and treating the remaining product with an agent which effects enolization and $\tau$-lactonization of the oxidation product to a compound containing the l-ascorbate radical, which modifies the existing pH and which is non-oxidizing under the conditions of the reaction.

16. In a process for the manufacture of a compound containing the levoascorbic acid radical the step which comprises treating a compound selected from the group consisting of 2-keto-levo-gulonic acid, its salts obtainable by neutralization or double decomposition of the carboxyl group, its carboxylic esters and its methylene ether derivatives with an agent which effects enolization and $\tau$-lactonization thereof to a compound containing the l-ascorbate radical, which modifies the existing pH, and which is non-oxidizing under the conditions of the reaction.

17. In a process for the manufacture of levo-ascorbic acid, the step which comprises heating a compound selected from the group consisting of 2-keto-levo-gulonic acid, its salts obtainable by neutralization or double decomposition of the carboxyl group, its carboxylic esters and its methylene ether derivatives in a non-oxidizing solution having an acid reaction.

18. In a process for the manufacture of levo-ascorbic acid, the step which comprises enolizing and lactonizing a compound of the group consisting of 2-keto-levo-gulonic acid and derivatives which yield such acid in the presence of acids, by treating such compound with hydrochloric acid.

19. In a process for the manufacture of levo-ascorbic acid from levo-sorbose, the steps which comprise oxidizing only the terminal primary alcohol group contiguous to the keto group of levo-sorbose to produce a 2-keto-levo-gulonic acid compound and treating the oxidation product with hydrochloric acid to effect enolization and $\tau$-lactonization thereof to a compound containing the levoascorbic acid radical.

20. In a process for the manufacture of a compound containing the levoascorbic acid radical, the step which comprises treating 2-keto-levo-gulonic acid with an agent which effects enolization and $\tau$-lactonization thereof to a compound containing the l-ascorbate radical and which modifies the existing pH and is non-oxidizing under the conditions of the reaction.

21. In a process for the manufacture of a compound containing the l-ascorbate radical, the step which comprises treating a compound of the general formula

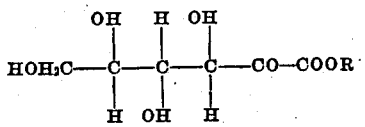

wherein R represents a radical selected from the group consisting of hydrogen and aliphatic, alicyclic and aralkyl radicals, with an alkaline reacting agent which is non-oxidizing under the conditions of the reaction, to produce enolization and τ-lactonization thereof.

22. In a process for the manufacture of a compound containing the l-ascorbate radical, the step which comprises treating a compound of the general formula

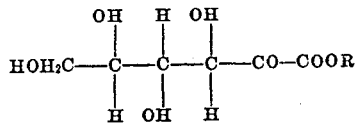

wherein R represents a radical selected from the group consisting of hydrogen and aliphatic, alicyclic and aralkyl radicals, with an alkali metal alcoholate, to produce enolization and τ-lactonization thereof.

23. In a process for the manufacture of a compound containing the levoascorbic acid radical, the step which comprises treating 2-keto-levo-gulonic-acid-methyl-ester with an alkaline reacting agent which is non-oxidizing under the conditions of the reaction to produce enolization and τ-lactonization thereof.

24. In a process for the manufacture of a compound containing the levoascorbic acid radical, the step which comprises treating a compound selected from the group consisting of 2-keto-levo-gulonic acid, its salts obtainable by neutralization or double decomposition of the carboxyl group, its carboxylic esters and its methylene ether derivatives with an agent which effects enolization and τ-lactonization thereof to a compound containing the levoascorbic acid radical, and which agent is non-oxidizing under the conditions of the reaction.

25. In a process for the manufacture of a compound containing the levoascorbic acid radical from levo-sorbose, the steps which comprise producing a 2-keto-levo-gulonic acid compound by a procedure which includes oxidizing only the terminal primary alcohol group contiguous to the keto group of levo-sorbose, and treating the 2-keto-levo-gulonic acid compound with an agent which effects enolization and τ-lactonization of the oxidation product to a compound containing the levoascorbic acid radical and which is non-oxidizing under the conditions of the reaction.

26. The process for the preparation of a compound containing the levoascorbic acid radical, which comprises treating levo-sorbose to oxidize its terminal alcohol group adjacent to the carbonyl group into a carboxylic acid group with production of a 2-keto-levo-gulonic acid product, and enolizing and lactonizing the latter into a compound containing the levoascorbic acid radical.

27. The process for the manufacture of levoascorbic acid, which consists in allowing a compound of the general formula

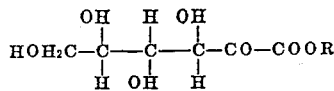

wherein R represents a radical selected from the group consisting of hydrogen and aliphatic, alicyclic and aralkyl radicals, to react with a base which is non-oxidizing under the conditions of the reaction and which causes enolization and lactonization of said compound, and acidifying the resulting product under non-oxidizing conditions to liberate levoascorbic acid therefrom.

28. In a process for the manufacture of a compound containing the l-ascorbate radical, the step which comprises heating a 2-keto-levo-gulonic acid ester in an aqueous alkaline medium which is non-oxidizing under the conditions of the reaction.

29. Process for the manufacture of ascorbic acid which comprises heating a 2-keto-levo-gulonic acid ester in an aqueous alkaline medium which is non-oxidizing under the conditions of the reaction, and acidifying the reaction product under non-oxidizing conditions to liberate levoascorbic acid.

30. Process for the manufacture of levoascorbic acid which comprises treating a compound selected from the group consisting of 2-keto-levo-gulonic acid, its salts obtainable by neutralization or double decomposition of the carboxyl group, its carboxylic esters and its methylene ether derivatives with a strong, non-oxidizing mineral acid until enolization and τ-lactonization are effected.

31. Process for the manufacture of ascorbic acid which comprises heating a 2-keto-levo-gulonic acid ester in alcohol under weakly alkaline, non-oxidizing conditions, and acidifying the reaction product under non-oxidizing conditions to liberate levoascorbic acid.

TADEUS REICHSTEIN.

Certificate of Correction

Patent No. 2,265,121.  December 2, 1941.

TADEUS REICHSTEIN

It is hereby certified that errors appear in the printed specification of the above numbered patent requiring correction as follows: Page 4, first column, lines 54, 60, and 73, second column, lines 13, 25, 52, and 58, page 5, first column, lines 2, 16, 24, 33, and 45, and second column, line 42, claims 13, 14, 15, 16, 19, 20, 21, 22, 23, 24, 25, and 30 respectively, for the Greek letter $\tau$ read $\gamma$; and that the said Letters Patent should be read with these corrections therein that the same may conform to the record of the case in the Patent Office.

Signed and sealed this 24th day of March, A. D. 1942.

[SEAL]

HENRY VAN ARSDALE,
*Acting Commissioner of Patents.*